April 19, 1927.
F. G. SIMPSON
1,625,504
CONVERTER OF ELECTRIC CURRENT
Filed July 6, 1926
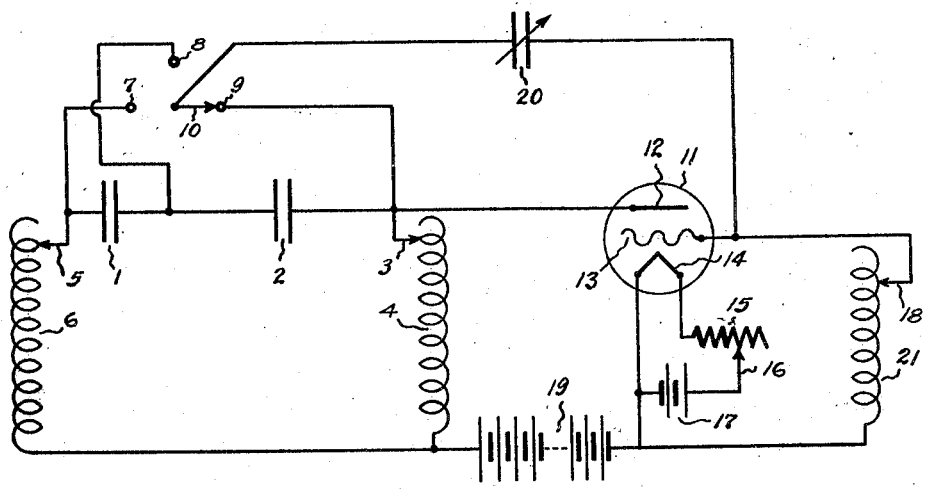
INVENTOR
Frederick Grant Simpson
BY
Fred C. Mathews
ATTORNEY Patented Apr. 19, 1927.

1,625,504

UNITED STATES PATENT OFFICE.

FREDERICK GRANT SIMPSON, OF SEATTLE, WASHINGTON.

CONVERTER OF ELECTRIC CURRENT.

Application filed July 6, 1926. Serial No. 120,696.

This invention relates to improvements in the arrangement and connections of electrical apparatus and in the adjustment of the constants of electrical circuits which include such apparatus; the object being to convert a direct electric current to an alternating electric current, or to transform an electric current of one frequency to an electric current of another frequency. The invention embodies a new method and a new means of accomplishing the result mentioned.

It is to be noted that I have included in my improved arrangement of circuits, and apparatus, certain known circuits, and combinations of apparatus, in an elementary way, to the extent that I have embodied therein a circuit which includes a three electrode electron valve connected in series with a generator of direct electric current, so arranged as to function in a manner wherein an alternating electric current will be created, and thereafter sustained, by pulses of electric current directly introduced into the circuit in which said alternating electric current resides. All of which have been shown in my United States Patent Number 1,507,689, in my prior application Serial Number 629,479, filed April 2, 1923, and in my prior application Serial Number 108,912, filed May 13, 1926. I depart, however, from the previous use of these circuits by omitting certain complementary circuits and in the provision of additional means for the adjustment of the constants of the circuits retained as a part of, and for use in connection with, the present invention. In my previous patent and patent applications, hereinabove mentioned, I have described a method, and have shown means for the application of such method, wherein a direct electric current may be converted to an alternating electric current, and said alternating electric current thereafter sustained, by the intoduction of pulses of said direct electric current directly into the circuit in which said alternating electric current resides; said pulses being so timed, in phase relation to said alternating current, by the action of electric valves, or an electric valve, as to permit the transfer of energy, represented by said pulses, to energy as represented by said alternating current. In my said previous patent, and patent applications, said electric valves are actuated by the application of electric potentials to their control members, such electric potentials having been generated within the circuit in which the said alternating current resides. In the present invention electric valves are, also, actuated by the application of electrical potential differences, generated in said alternating current circuit, to their control members; but means are provided whereby such electrical potential differences may bear a different phase relation to the pulses of direct current admitted to said alternating current circuit than that described in my hereinabove mentioned patent and patent applications. In the present invention the electric valves may each open and close at least twice during the period of a cycle of said alternating current, whereas in my previous inventions, as described in the hereinbefore mentioned patent and patent applications, such valves could open and close but once during said period. All as will be understood from the following description in connection with the accompanying drawings.

In carrying out the above defined object I preferably employ a form of converter of electric current which embodies a three electrode electron valve, having a separate control member, usually that electrode commonly termed the grid, but which may be any element of the valve which controls the conductivity of the anode to cathode path thereof.

In this description I shall designate as "triodes" three electrode electron valves, each embodying an evacuated vessel containing a hot cathode, an anode in the form of a plate or concentric cylinder, and another electrode placed in position, relative to the cathode and anode, such that variations in its potential with respect to either of the two other electrodes, will cause like variations in the current between them. I shall designate the anode as the "plate", the cathode as the "filament" and the third electrode as the "grid". I shall, in this description, consider the grid as the control member of the triode. It is to be understood that any other type of the electric valve, which may be capable of performing the functions hereinafter described, may be substituted for the type of electric valves herein defined as triodes, without departing from the scope of my invention.

In the drawings the figure illustrates, diagrammatically, a typical form of my arrangement of apparatus in an electrical circuit for the purpose of converting direct electric current to alternating electric current.

Referring to the figure, the numeral 1 represents a condenser which is connected in series with another condenser, 2, a switch, 3, an inductance coil, 4, an inductance coil, 6, and a switch, 5. The circuit thus formed constitutes an oscillatory circuit, in which the alternating current to be created, and thereafter sustained, resides. I shall hereinafter refer to the above defined circuit as the "oscillatory circuit." The numeral 10 represents an electric switch having contact points 7, 8 and 9. The triode, 11, has plate, 12, grid, 13, and filament, 14. The filament, 14, is heated by an electric current supplied by the battery, 17; said heating current being controlled by means of the rheostat, 15, and switch, 16. The numeral 18 represents a switch which controls the inductance introduced by the inductance coil, 21, which is connected in series with switch, 18, between the grid, 13, and the filament, 14. The electric battery, or direct current electric generator, 19, has its positive terminal connected to the common terminal of the coils 4 and 6, its negative terminal is connected to one terminal of the filament 14. A variable condenser, 20, has one of its terminals connected to the switch 10, its other terminal is connected to the grid 13. The common terminal of the condenser 1 and switch 5 is connected to the switch contact point 7. The common terminal of condensers 1 and 2 is connected to the switch contact point 8. The common terminal of condenser 2 and switch 3 is connected to the switch contact point 9. The common terminal of switch 3 and condenser 2 is connected to the plate 12. The sizes of the various parts are established by well known laws governing the adjustment of oscillatory circuits to be resonant at various frequencies, within the limits of the power involved, except that the condenser 20, in connection with the variable inductance coil 21, must be capable of adjustment to a value of capacity which will make the circuit of which it is a part resonant at, substantially, a frequency not less than twice the resonant frequency of the oscillatory circuit. While but two condenser units, 1 and 2, have been shown in the figure, it is obvious that more of these units may be provided with a corresponding increase in the number of switch contact points of switch 10.

In the operation of this arrangement of circuits the filament temperature of the triode 11 is adjusted, by means of the switch 16, to a degree suitable for the best operation of the triode, under the desired conditions. The oscillatory circuit is adjusted to be resonant, at the alternating current frequency desired, by means of switches 3 and 5, care being taken to maintain the active inductance of coil 4 substantially equal to that of coil 6. Switch 10 is placed, preferably, on contact point 7. Condenser 20 adjusted to produce an alternating current of maximum amplitude in the oscillatory circuit. The conditions are now similar to those described in my patent application Serial Number 108,912, hereinbefore mentioned. A charge, proportional to the initial difference of potential between switches 3 and 5, will be resident in the condenser consisting of the units 1 and 2. The discharge of this condenser, and subsequent reverse charge, by way of the coils 4 and 6 will constitute the first half-cycle of alternating current in the oscillatory circuit. Successive alternate half cycles of said alternating current will be reinforced by increments of energy, introduced into said circuit, through the medium of the magnetic field produced in coil 4 by the convection current which intermittently exists in battery 19, coil 4, and plate to filament path of the triode 11; said energy being released in the oscillatory circuit by the interruption of said convection current in the triode. All as has been more completely explained in my patent application Serial Number 108,912. If now the switch 10 be adjusted, say, to contact point 9, and condenser 20 be adjusted together with inductance coil 21, in a manner approaching resonance in the circuit of which condenser 20 is a part at a frequency twice that of the resonant frequency of the oscillatory circuit, the amplitude of the alternating current in the oscillatory circuit will diminish, reaching a minimum value at approximately the time when the circuit containing condenser 20 is approximately resonant at said double frequency. If now the condenser 20 be further reduced in capacity, or if coil 21 be reduced in inductance, the alternating current in the oscillatory circuit will increase in amplitude to a value approaching nearly, or the equal of, the previous maximum value of said alternating current amplitude. In this condition, the triode, 11, still functions as a valve but with a potential variation between its grid and filament of substantially twice the frequency of the potential variation between its plate and filament.

An investigation of the above described phenomena, by means of a cathode ray oscillograph, has shown that with the switch 10 placed on switch contact point 7, and condenser 20 adjusted at a rather large capacity value, so that the alternating current potential difference between its terminals is less, or not much greater, than the alternating current potential difference between the terminals of the active part of coil 6, there is a potential variation between the grid 13 and the filament 14 of the same frequency as the potential variation between the plate 12 and the filament 14, and that this frequency is the frequency of the alternating current in the oscillatory circuit. The phase relation between the said grid and filament potential difference and the said plate and filament potential difference may be varied by either varying switch 10 or condenser 20, or by varying switch 18, and the time during which the triode 11 is closed as a valve thereby adjusted to coincide with the discharge time period of coil 4, or to include a part only of such time period. Further adjustment of any, or all, of the switches 10 and 18 and condenser 20, in accordance with the instructions hereinbefore given, to a condition indicated by minimum alternating current amplitude in the oscillatory circuit, produces a figure on the oscillograph screen which indicates a point of transition, of the potential difference frequency between the grid and filament, where the time period during which the triode 11 is closed as a valve is a small fraction of the time period of discharge of coil 4. At this point of transition there is, therefore, minimum reinforcement of the alternating current in the oscillatory circuit, as the discharge current of coil 4 is diverted from the oscillatory circuit by the relatively low impedance of the plate to filament path, of the triode, during the greater part of such discharge period. Further reduction of, say, the capacity of condenser 20 produces a figure on the oscillograph screen, which indicates that the frequency of the potential between the grid and filament is twice that of the frequency of the potential between the plate and filament; this condition will endure throughout a rather considerable further reduction of the capacity of condenser 20. The result of such further reduction is to produce distortion of the potential wave between the grid and filament; and a condition may be reached where there is again a maximum reinforcement of the alternating current in the oscillatory circuit by discharge of coil 4. Coil 4 may be made to discharge an increment of energy in the oscillatory circuit during the period of each half-cycle of alternating current, therein, in this manner; as by means of the double frequency potential variation of the grid, with respect to the filament, the triode may be made to close as a valve at least once during each half-cycle of such alternating current.

An investigation of the current wave shape, of the alternating current in the oscillatory circuit, by means of either an oscillograph or wave-meter, did not show that any harmonic frequencies were produced in said circuit under any of the conditions herein discussed.

It is obvious that changes may be made in the shape, kind and arrangement of the various parts, of the means shown herein, as suitable for the application of my invention, without departing from the broad scope of the appended claims. It is further apparent that my arrangement of circuits and electrical apparatus may be modified in many ways to adapt its use for particular purposes. As an example: My invention may be used for supplying, or converting, current at a radio transmitting, or receiving, station; the parts, and the means shown being modified in any of the several known ways to accord with the particular requirements involved in such use. It may also be used as a frequency transformer, such use involving the impressing of a potential difference of one frequency between the grid and filament of a triode and deriving a current of substantially sub-multiple frequency in an oscillatory circuit thereby. Several of these devices may be placed in cascade connection for the purpose of further frequency reduction.

Having set forth the nature and object of my invention, and means and arrangements for accomplishing the purposes thereof, what I claim as new and useful, and of my own invention, and desire to secure by Letters Patent is:

1. The method of creating an alternating electric current, in an oscillatory circuit, which consists in directly supplying increments of energy, to said oscillatory circuit, in the form of unidirectional pulsations of electric current; said pulsations being resident in a part of said oscillatory circuit, but having a source external to said circuit; successive pulses, of said pulsations, being uniformly in the same direction and said pulsations being delivered to said oscillatory circuit at substantially twice the frequency of said alternating current.

2. The method of sustaining an alternating electric current, in an oscillatory circuit, which consists in directly supplying increments of energy, to said oscillatory circuit, in the form of unidirectional pulsations of electric current; said pulsations being resident in a part of said oscillatory circuit, but having a source external to said circuit; successive pulses, of said pulsations, being uniformly in the same direction and said pulsations being delivered to said oscillatory circuit at substantially twice the frequency of said alternating current.

3. The method of amplifying an alternating electric current, in an oscillatory circuit, which consists in directly supplying increments of energy, to said oscillatory circuit, in the form of unidirectional pulsations of electric current; said pulsations being resident in a part of said oscillatory circuit, but having a source external to said circuit; successive pulses, of said pulsations, being uniformly in the same direction; and said pulsations being delivered to said oscillatory circuit at substantially twice the frequency of said alternating current.

4. The method of creating an alternating electric current, in an oscillatory circuit, which consists in conducting a direct electric current through a part of said circuit and through a valve, external to said circuit; said valve being actuated at not less than twice the frequency of said alternating current by the variation of the energy distribution within said circuit; said direct current being varied by the action of said valve in a manner wherein increments of energy are supplied within said circuit to said alternating current.

5. The method of sustaining an alternating electric current, in an oscillatory circuit, which consists in conducting a direct electric current through a part of said circuit and through a valve, external to said circuit; said valve being actuated at not less than twice the frequency of said alternating current by the variation of the energy distribution within said circuit; said direct current being varied by the action of said valve in a manner wherein increments of energy are suppled within said circuit to said alternating current.

6. The method of amplifying an alternating electric current, in an oscillatory circuit, which consists in conducting a direct electric current through a part of said circuit and through a valve, external to said circuit; said valve being actuated at not less than twice the frequency of said alternating current by the variation of the energy distribution within said circuit; said direct current being varied by the action of said valve in a manner wheren increments of energy are supplied within said circuit to said alternating current.

7. The method of converting a direct electric current to an alternating electric current, which consists in conducting said direct electric current through a part of said circuit and through a valve, external to said circuit; said valve being actuated at not less than twice the frequency of said alternating current by the variation of the energy distribution within said circuit; said direct current being varied by the action of said valve in a manner wherein increments of energy are supplied within said circuit to said alternating current.

8. In a converter of electric currents; a source of direct electric current, an oscillatory circuit, an electric valve having a control member, said valve being external to said circuit; means for actuating said valve at twice the frequency of said circuit, by potential differences generated within said circuit; and means for conducting pulses of said direct current through a part of said circuit and through said valve.

9. In a converter of electric currents; a source of direct electric current, an oscillatory circuit, an electric valve having a control member, said valve being external to said circuit; means for actuating said valve at not less than twice the frequency of said circuit; by potential differences generated within said circuit, and means for conducting pulses of said direct current through a part of said circuit and through said valve.

10. The method of producing an alternating electric current of a definite frequency, which consists in impressing potential variations of substantially twice such frequency between two electrodes of an electric valve.

The foregoing specification signed at Seattle, Washington, this 29 day of June, 1926.

FREDERICK GRANT SIMPSON.